Patented Dec. 7, 1948

2,455,881

UNITED STATES PATENT OFFICE 2,455,881

MERCURY-TREATED CHARCOAL CATALYST AND PROCESS FOR ITS PREPARATION

Leroy Frank Salisbury, Wilmington, Del., assignor to E. I. du Pont de Nemours & Company, Wilmington, Del., a corporation of Delaware No Drawing. Original application September 7, 1945, Serial No. 615,090. Divided and this application July 18, 1947, Serial No. 762,009

6 Claims. (Cl. 252—217)

This invention relates to a novel catalyst and to a process for obtaining the same.

Many catalysts consisting of catalytically active metals or their oxides, either alone or supported on suitable substrates, are known to catalyze the reaction between acetylene and hydrogen fluoride to produce vinyl fluorides. Particularly well known compositions are those obtained by impregnating charcoal with a suspension of mercuric oxide or by formation of the oxide in situ on the charcoal. In the copending application of Leroy Frank Salisbury, Serial No. 508,243, filed October 29, 1943 (now U. S. Patent No. 2,426,792), highly useful charcoal supported mercury compound catalysts are disclosed as employable in the synthesis of vinyl fluoride and 2-fluoro-1,3-butadiene. Although these catalysts, and especially those disclosed in the aforementioned application of Leroy Frank Salisbury, are advantageously useful for their designed purpose, at times they are characterized by certain disadvantages. Thus, a large part of the total mercury present in the charcoal may be lost as free mercury during the catalyst preparation or operation, thereby reducing the activity of the catalyst. Known charcoal-supported mercury catalysts, such as may be prepared by roasting charcoal impregnated with mercuric nitrate as disclosed in the aforementioned application of Leroy Frank Salisbury, although initially very active in the synthesis of 2-fluoro-1,3-butadiene, gradually become inactive. For instance, in 12 to 16 hours these compositions may frequently lose as much as 50% of their initial activity.

This invention has as an object a charcoal-supported mercury catalyst which is not subject to the aforementioned disadvantages. A further object is to provide a new and improved charcoal-supported mercury catalyst for preparing 2-fluoro-1,3-butadiene from monovinylacetylene and hydrogen fluoride. Additional objects will become apparent from an examination of the following description and claims.

These and other objects and advantages are accomplished according to the herein-described invention which comprises mercuric oxide-impregnated charcoal coated with basic mercuric nitrate.

Broadly, the catalyst compositions of this invention are obtained by impregnating charcoal with mercuric oxide, drying, coating the mercuric oxide-impregnated charcoal with basic mercuric nitrate, and then drying the resulting composition.

In one preferred embodiment charcoal is impregnated with an aqueous solution of a mercuric salt, the concentration of said solution being such as to provide an impregnated charcoal containing said mercuric salt in an amount within the range of from two to 198 grams, calculated as elementary mercury, per liter of charcoal. Thereafter said salt is precipitated in situ as mercuric oxide, the resultant impregnated charcoal is washed with water, dried at a temperature below 75° C., contacted with an aqueous suspension of basic mercuric nitrate, the concentration of said suspension being such as to provide a basic mercuric nitrate coating on said charcoal in an amount within the range of from two to 198 grams, calculated as elementary mercury, per liter of charcoal and a total weight of mercuric oxide and basic mercuric nitrate associated with said charcoal within the range of from four to 200 grams, calculated as elementary mercury, per liter of charcoal, and the resultant product is dried at a temperature below 75° C.

The following examples, in which proportions are in parts by weight unless otherwise specified, are given for illustrative purposes and are not intended to place any restrictions on the herein-described invention.

Example I

Charcoal sized to pass an 8-inch sieve but retained on a 14-mesh sieve was impregnated with aqueous mercuric nitrate solution using 100 g. of mercuric nitrate, 12.5 cc. of concentrated nitric acid, and 400 cc. of water per liter of charcoal. The product was dried at room temperature until free of surface water and then stirred thoroughly with aqueous sodium hydroxide solution using 100 g. sodium hydroxide and one liter of water per liter of charcoal. The resulting product was washed in distilled water for 24 hours, drained and air-dried. Analysis showed the product to contain 17.3% mercuric oxide.

The mercuric oxide-impregnated charcoal prepared as described above was stirred with a suspension of 150 g. of basic mercuric nitrate in 325 cc. of water for each two liters of charcoal. The product was then dried in vacuo at room temperature. Analysis showed it to contain 2.6% water, 26.9% mercury, and 0.52% nitrogen.

The basic mercuric nitrate employed above was prepared by adding with rapid stirring aqueous sodium hydroxide solution to a solution of mercuric nitrate in aqueous nitric acid until the pH of the mixture was within the range of from 3 to 3.5, following which the precipitated basic mercuric nitrate was filtered off, washed with distilled water, and dried at 120° C.

Example II

A reactor consisting of a 1.5″ x 21″ iron pipe fitted at the top with a 1.5″ pipe T with one opening of the T connected to a source of monovinylacetylene and the other to a source of hydrogen fluoride, was charge with 500 cc. of the catalyst prepared in Example I. During 76 hours a substantially uniform, dry mixture of 91 g. of 2-fluoro-1,3-butadiene, 1477 g. of monovinylacetylene, and about 565 g. hydrogen fluoride (a mol ratio of monovinylacetylene to hydrogen fluoride of 1 to 1.05), together with two volumes of nitrogen per volume of the monovinylacetylene/hydrogen fluoride mixture, was passed through the catalyst bed at a temperature within the range of 30°–75° C. at atmospheric pressure. The contact time was about 45 seconds. Six hundred twenty grams of monovinylactelyene, 930 g. of 2-fluoro-1,3-butadiene, and 29 g. of 3,3-difluoro-1-butene were obtained as products, corresponding to a 41% conversion to 2-fluoro-1,3-butadiene of the monovinylacetylene passed, and a yield of 71% based on the monovinylacetylene consumed.

Example III

In contrast to the above, the most efficient charcoal-supported mercury catalyst for the 2-fluoro-1,3-butadiene synthesis known heretofore, and described in Serial No. 508,243 application previously mentioned, was made by impregnating five liters of moist charcoal with mercuric nitrate in amount equivalent to 100 g. of mercuric oxide per liter, the volume of the mercuric nitrate solution used being such as to just wet the charcoal. The impregnated charcoal was then dried for 20 hours at 90° C. to 100° C. at 10 to 30 mm. of mercury pressure, and finally for 20 hours at 95° C. to 100° C. at one to three mm. of mercury pressure. During this period oxides of nitrogen were evolved. Analysis showed that substantially all of the mercury initially present was retained in the dried catalyst and that the atomic ratio of mercury to nitrogen was about 1:0.55.

Seven hundred and fifty cc. of the above catalyst were charged into a 1.5″ diameter iron pipe. During 70 hours, a substantially uniform dry mixture of monovinylacetylene (containing 6% 2-fluoro-1,3-butadiene) and hydrogen fluoride in the mol ratio of 1 $CH_2=CH-C\equiv CH$ to 1.25 HF, together with two volumes of nitrogen per volume of monovinylacetylene/hydrogen fluoride mixture, was passed through the catalyst bed at a temperature within the range of from 30° C. to 75° C. at atmospheric pressure and at a contact time of about 45 seconds. The conversion to 2-fluoro-1,3-butadiene during this period of reaction was 18% of the monovinylacetylene passed at a yield of 65% based on the monovinylacetylene consumed.

Example IV

For further contrast with the catalysts of this invention, a catalyst was prepared by adding charcoal impregnated with mercuric nitrate to excess aqueous sodium hydroxide, washing thoroughly with water, and drying at room temperature in vacuo. Analysis showed the product to contain 2.5% water and 16.9 mercuric oxide.

Seven hundred and fifty cc. of the above catalyst was charged into a 1.5″ diameter iron pipe. During 78 hours, a substantially uniform, dry mixture of monovinylacetylene (containing 5% of 2-fluoro-1,3-butadiene), and hydrogen fluoride in the mol ratio of 1 $CH_2=CH-C\equiv CH$ to 1.06 HF, together with two volumes of nitrogen per volume of the monovinylacetylene/hydrogen fluoride mixture, was passed through the catalyst bed at a temperature within the range of 30° C. to 75° C. at atmospheric pressure and a contact time of about 45 seconds. The average conversion to 2-fluoro-1,3-butadiene obtained was 14% of the monovinylacetylene passed and the average yield was 58%, based on the monovinylacetylene consumed.

Example V

For still further comparison, a catalyst was made by coating one liter of charcoal with a mixture of 100 g. of finely divided basic mercuric nitrate (made as described in Example I) in 400 cc. of water, followed by drying in vacuo at room temperature. Analysis of the product showed it to contain 2.5% water, 19.6% mercury, and 0.64% nitrogen.

Seven hundred and fifty cc. of the catalyst was charged into a 1.5″ diameter iron pipe. During 65 hours, a substantially uniform, dry mixture of monovinylacetylene (containing 8% of 2-fluoro-1,3-butadiene), and hydrogen fluoride in the mol ratio of 1 $CH_2=CH-C\equiv CH$ to 1 HF, together with two volumes of nitrogen for each volume of the monovinylacetylene/hydrogen fluoride mixture, was passed through the catalyst bed at a temperature within the range of 30° C. to 75° C. at atmospheric pressure and at a contact time of about 45 seconds. The average conversion to 2-fluoro-1,3-butadiene based on the monovinylacetylene passed was 16% and the yield was 51%, based on the monovinylacetylene consumed.

The mercuric oxide oxide impregnated, basic mercuric nitrate coated charcoal catalysts of this invention are particularly useful in the synthesis of 2-fluoro-1,3-butadiene from monovinylacetylene and hydrogen fluoride. These catalysts may be made by any method which does not lead to the formation of free mercury. In the preparation of such a catalyst, the charcoal may be impregnated with any water-soluble mercuric salt, such as mercuric acetate, or a solution of mercuric chloride in aqueous hydrochloric acid, the impregnated charcoal then treated with an inorganic basic water soluble substance, e. g., an alkali metal carbonate, bicarbonate, hydroxide, oxide, etc., in amount sufficient to precipitate all of the mercury as the oxide, and the mercuric oxide impregnated charcoal is washed thoroughly to remove soluble salts, after which it is dried at a temperature below 100° C., preferably at a temperature below 75° C. The mercuric oxide impregnated charcoal thus obtained is coated with a suspension of basic mercuric nitrate, and the resulting product is dried at a temperature below 100° C., preferably at a temperature below 75° C. The concentration of mercuric oxide is within the range of from two to 198 grams, calculated as elementary mercury, per liter of charcoal and of basic mercuric nitrate is within the range of from two to 198 grams, calculated as elementary mercury, per liter of charcoal, the total concentration of mercuric oxide and basic mercuric nitrate being within the range of from four to 200 grams, calculated as elementary mercury, per liter of charcoal. The preferred compositions from the standpoint of activity and economical operation are those in which the total concentration of mercuric oxide and basic mercuric nitrate is within the range of from 50 to 100 grams, calculated as elementary mercury, per liter of charcoal, the concentrations of mercuric oxide and of basic mercuric nitrate each being within the range of from 25 to 75 grams, calculated as elementary mercury, per liter of charcoal.

As a rule, it is preferred to effect the drying of the catalyst at ordinary pressures or under reduced pressures. If desired, however, drying can be effected by blowing a current of dry air through the catalyst at a temperature below 100° C.

It is necessary to dry the catalyst at temperatures below 100° C. in order to avoid the formation of free mercury, which occurs freely at higher temperatures. Even at temperatures between 75° C. and 100° C. a minor proportion of preparations will fail because of the formation of free mercury. By drying below 75° C. almost no failures will occur, and below about 50° C. failures due to mercury formation will be entirely eliminated.

As a support, charcoal derived from the incomplete combustion of animal or vegetable matter, e. g., wood, bone, nutshells, coconut, etc., is preferred for use. The active charcoal may be in granular or finely divided condition.

Although mercuric nitrate comprises the preferred type of mercury salt used in the impregnation of the charcoal, other water-soluble mercuric salts, as well as mixtures thereof, can be used. Thus, such salts as mercuric acetate, mercuric chloride, etc., can be used.

As a rule, the amount of catalyst used in such that the reactor space is completely filled.

The hydrogen fluoride and acetylene should be passed through the catalyst bed at a space velocity such as to provide a contact time of 10 to 100 seconds and preferably from 30 to 60 seconds.

The mol ratio of monovinylacetylene to hydrogen fluoride is generally within the range of from 1:2 to 2:1 and preferably is within the range of from 1:1.2 to 1:1.

As previously indicated, the catalysts of this invention comprise mercuric oxide impregnated charcoal subsequently coated with preformed basic mercuric nitrate.

The catalysts of this invention are especially useful and efficient for the synthesis of 2-fluoro-1,3-butadiene from monovinylacetylene and hydrogen fluoride.

The process is generally operated at atmospheric pressure but if desired superatmospheric or subatmospheric pressures may be employed.

As many apparently widely different embodiments of this invention may be made without departing from the spirit and scope thereof, it is to be understood that I do not limit myself to the specific embodiments thereof except as defined in the appended claims.

This application is a division of my application Serial No. 615,090 filed September 7, 1945 (now U. S. Patent No. 2,437,308).

Having described the present invention, the following is claimed as new and useful:

1. The process for obtaining a catalyst, which comprises impregnating charcoal with an aqueous solution of a mercuric salt, the concentration of said solution being such as to provide an impregnated charcoal containing said mercuric salt in an amount within the range of from two to 198 grams, calculated as elementary mercury, per liter of charcoal, then converting said salt in situ to mercuric oxide, drying the impregnated charcoal at a temperature below 100° C., thereafter contacting the charcoal with a suspension of basic mercuric nitrate, the concentration of said suspension being such as to provide a basic mercuric nitrate coating on said charcoal in an amount within the range of from two to 198 grams, calculated as elementary mercury, per liter of charcoal, and a total weight of mercuric oxide and basic mercuric nitrate associated with the charcoal within the range of from four to 200 grams, calculated as elementary mercury, per liter of charcoal, and drying the resultant product at a temperature below 100° C.

2. The process for obtaining a catalyst, which comprises impregnating charcoal with an aqueous solution of a mercuric salt, the concentration of said solution being such as to provide an impregnated charcoal containing said mercuric salt in an amount within the range of from two to 198 grams, calculated as elementary mercury, per liter of charcoal, thereafter precipitating said salt in situ as mercuric oxide, washing the resultant impregnated charcoal with water, drying said charcoal at a temperature below 100° C., contacting the charcoal with a suspension of basic mercuric nitrate, the concentration of said suspension being such as to provide a basic mercuric nitrate coating on said charcoal in an amount within the range of from two to 198 grams, calculated as elementary mercury, per liter of charcoal, and a total weight of mercuric oxide and basic mercuric nitrate associated with the charcoal within the range of from four to 200 grams, calculated as elementary mercury, per liter of charcoal, and drying the resultant product at a temperature below 100° C.

3. The process for obtaining a catalyst, which comprises impregnating charcoal with an aqueous solution of a mercuric salt, the concentration of said solution being such as to provide an impregnated charcoal containing said mercuric salt in an amount within the range of from 25 to 75 grams, calculated as elementary mercury, per liter of charcoal, thereafter precipitating said salt in situ as mercuric oxide, washing the resultant impregnated charcoal with water, drying said charcoal at a temperature below 75° C., contacting the charcoal with a suspension of basic mercuric nitrate, the concentration of said suspension being such as to provide a basic mercuric nitrate coating on said charcoal in an amount within the range of from 25 to 75 grams, calculated as elementary mercury, per liter of charcoal, and a total mercuric oxide and basic mercuric nitrate concentration within the range of from 50 to 100 grams, calculated as elementary mercury, per liter of charcoal, and drying the resultant product at a temperature below 75° C.

4. The process for obtaining a catalyst, which comprises impregnating charcoal with an aqueous solution of mercuric nitrate, the concentration of said solution being such as to provide an impregnated charcoal containing said mercuric nitrate in an amount within the range of from 25 to 75 grams, calculated as elementary mercury, per liter of charcoal, thereafter contacting said impregnated charcoal with an aqueous sodium hydroxide solution whereby said mercuric nitrate is precipitated in situ as mercuric oxide, washing the resultant impregnated charcoal with water, drying said charcoal at a temperature below 50° C., contacting the charcoal with an aqueous suspension of basic mercuric nitrate, the concentration of said suspension being such as to provide a basic mercuric nitrate coating on said charcoal in an amount within the range of from 25 to 75 grams, calculated as elementary mercury, per liter of charcoal, and a total mercuric oxide and basic mercuric nitrate concentration within the range of from 50 to 100 grams, calculated as elementary mercury, per liter of charcoal, and drying the resultant product at a temperature below 50° C.

5. Charcoal impregnated with mercuric oxide in an amount within the range of from two to 198 grams, calculated as elementary mercury, per liter of charcoal, and coated with basic mercuric nitrate in an amount within the range of from two to 198 grams, calculated as elementary mercury, per liter of charcoal, the total weight of mecuric oxide and basic mercuric nitrate associated with the charcoal being an amount within the range of from four to 200 grams, calculated as elementary mercury, per liter of charcoal.

6. Charcoal impregnated with mercuric oxide in an amount within the range of from 25 to 75 grams, calculated as elementary mercury, per liter of charcoal and coated with basic mercuric nitrate in an amount within the range of from 25 to 75 grams, calculated as elementary mercury, per liter of charcoal, the total weight of mercuric oxide and basic mercuric nitrate associated with the charcoal being an amount within the range of from 50 to 100 grams, calculated as elementary mercury, per liter of charcoal.

LEROY FRANK SALISBURY.

No references cited.

Certificate of Correction

Patent No. 2,455,881.　　　　　　　　　　　　　　　　　　　December 7, 1948.

LEROY FRANK SALISBURY

It is hereby certified that errors appear in the printed specification of the above numbered patent requiring correction as follows:

Column 2, line 28, Example I, for the word "inch" read *mesh*; column 3, line 6, Example II, for "charge" read *charged*; column 5, line 30, Example V, for the words "in such" read *is such*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*